Figure 1:
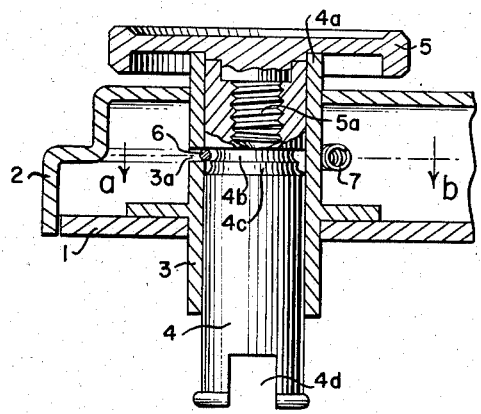

INVENTORS
WILLY KADEN
FERDINAND STIEFENHOFER

United States Patent Office 2,874,914
Patented Feb. 24, 1959

2,874,914

REWINDING DEVICE FOR PHOTOGRAPHIC CAMERAS

Willy Kaden and Ferdinand Stiefenhofer, Munich, Germany, assignors to AGFA Aktiengesellschaft, a corporation of Germany Application June 15, 1954, Serial No. 436,868

Claims priority, application Germany July 9, 1953

8 Claims. (Cl. 242—71.3)

This new invention relates to a device for rewinding of films after their exposure within photographic cameras and, in particular, miniature cameras. More specifically the invention relates to a drag brake device being effective only during rewinding for preventing damage thereby to the film during forward movement.

From the practical use of cameras, it has been experienced that the additional braking moment of the rewinding device, very often leads to damage to the film perforations, in particular, in cases where the film feeding takes place from sprocket wheels via a rapid wind lever. The elasticity of the film often causes it to wind in a direction opposite to the rewinding direction, which takes place if the rewind knob is released during rewinding, even if only for the short moment when trying to move it further. In order to avoid this defect, others have tried to arrange the rewind axis freely so that the retraction moment would be reduced, but without much practical success.

To prevent these disadvantages, an arrangement is suggested here for the first time whereby the rewind device during the forward movement of the film tape is arranged so that it is free of any external influence, but which in the rewind position, for counteracting the elasticity of the film, is subject to a predetermined braking force.

According to this new invention the rewind shaft carries two closely located annular grooves of different depths, one of which can be coupled with the retarding device by moving the rewind shaft axially. An elastically urged yoke passes through a slot which is tangentially formed into a stationary bearing member. The yoke is level with but does not contact the upper and deeper annular groove of the rewind shaft when the shaft is in the forward movement position. When the rewind shaft is moved into the rewind position, the yoke seats into the lower of the two annular grooves. The yoke is held in such position by a spring which surrounds the stationary bearing member and which is calibrated so that it will not pull the yoke into the upper, deeper annular groove. The axial movement of the rewind shaft to the stopping or rewinding position is proportioned in such a manner that the operation of the film coil is unhampered.

The advantage of the above-described arrangement lies not only in the fact that on account of the simple, practical and distinct construction only few and relatively inexpensively produceable individual parts are necessary; but also in the fact that on account of the drag-free arrangement of the rewind shaft during the forward moving of the film, any additional damaging movement is avoided and the film perforations are relieved to a great extent.

A particular feature of the invention resides in the fact that the yoke member functions both as a frictional brake element limiting rotative movement of the rewind shaft and as a detent for holding the shaft in its preset axial position.

Accordingly a prime object of the invention is to provide an inexpensive and improved film rewinding device. Another object is to provide a novel friction brake and detent. Other objects will become apparent from the description and claims which follow.

Figure 2:
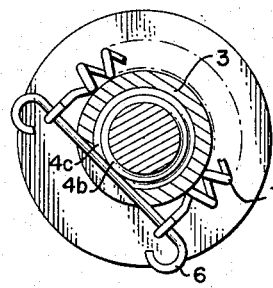
Figure 3:
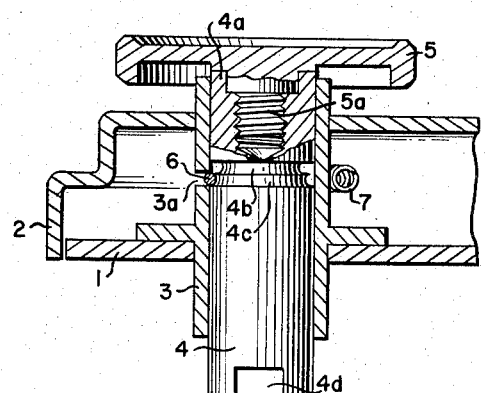

Having broadly disclosed the invention, reference will now be made to a specific example of the same in connection with the annexed drawing, and in which:

Fig. 1 shows a vertical section of the rewinding device in its normal non-operative position, Fig. 2 shows a horizontal section through Fig. 1 in the plane $a$—$b$, and Fig. 3 shows a vertical section through the rewinding device in its rewinding position.

The stationary plate 1 of the camera casing is surrounded by a cap 2 which encloses a cylindrical guiding and distance bush 3. The bush 3 is tightly connected by any appropriate means and in a known manner with the plate 1. The rewinding shaft 4 is slidably located in the bush. A control knob 5 is threaded into the upper end 4 of the rewind shaft by means of threads 5a.

The rewind shaft, for the purposes of the invention, is provided with two unevenly deep or radially stepped annular grooves 4b and 4c. A tangential slot 3a is formed in the wall of bush 3 and which in the normal axial position of the rewind shaft cooperates with groove 4b (see Fig. 1) and in the other axial position cooperates with groove 4c (see Fig. 3).

A straight bar or yoke 6 is mounted in slot 3a so that in the rewind position of shaft 4 (see Fig. 3), it mates with the lower annular groove 4c. Whereas in the other slidable position of shaft 4, the yoke 6 mates with groove 4b. The yoke is held in slot 3a resiliently by a spring 7 which surrounds the bush 3.

The rewind shaft 4 has a recess 4d at its lower end which engages in a known manner the conventional film coil (not illustrated in the drawing). Furthermore, the rewind shaft is so proportioned in size that the performance of the film coil is not hampered in any way, i. e., not even in the rewind position.

It will be apparent that the present arrangement presents an extremely simple and inexpensive structure which functions both as a selective braking element and as a detent. Thus, manual movement of the shaft 4 from the non-operative or forward film movement position of Fig. 1 to the rewind position of Fig. 3 causes the yoke bar 6 to automatically snap into groove 4c whereby the shaft 4 is subjected to the drag braking force of spring 7. At the same time the seating of the yoke in the groove retains the shaft in the rewind position.

As many widely different embodiments of this invention may be made without departing from the spirit and scope hereof, it is to be understood that the above invention is not limited, except as described in the appended claims.

What is claimed is:

1. A film rewinding device for a photographic camera comprising a shaft adapted for operative connection to a film holding spool, bearing means rotatably mounting said shaft upon said camera, said shaft including a pair of grooves of different depths disposed closely adjacent each other, a resilient braking means mounted upon said camera adjacent said grooves and constructed and arranged to exert a frictional braking force upon the shallower of said grooves and to be free of contact with said deeper groove, coupling means operatively associating said resilient braking means with said shaft, and said coupling means permitting relative axial displacement of said braking means and said grooves to optionally bring said braking means into contact with said shallower groove to apply a frictional resistance to rotation of said rewinding means and to bring said braking means into alignment with the deeper of said grooves to permit free rotation of said shaft.

2. A film rewinding device as claimed in claim 1, in which said shaft is axially displaceable in a fixed bush forming part of the camera housing, said bush having a tangential slot located opposite the deeper groove when said shaft is free, and in which said resilient braking means is a spring-loaded yoke passing through the slot, which latter is so dimensioned that the yoke can enter the shallower groove but not in the deeper one.

3. A film rewinding device as claimed in claim 2 in which the yoke is loaded by a spring anchored to its ends and passing round the bush.

4. A film rewinding device for photographic cameras comprising a rotatable shaft adapted to be operatively connected to a film holding spool, said shaft being axially adjustable within a sleeve mounted upon said camera, said shaft including a pair of grooves perpendicular to the axis of said shaft, one of said grooves being deeper than the other, a resilient means extending within said sleeve at a predetermined axial position, said resilient means substantially engaging the walls of the shallower groove, said shallower groove and resilient means being correspondingly formed to exert a frictional braking force upon said shaft when said shaft is axially adjusted to bring said shallower groove into alignment with said resilient means, and said resilient means entering said deeper groove substantially free of contact with the walls of said deeper groove when said shaft is moved to bring said deeper groove into axial alignment with said resilient means.

5. A film rewinding device as set forth in claim 4 wherein said pair of grooves are positioned adjacent each other.

6. A film rewinding device as set forth in claim 4 wherein said sleeve includes a slot disposed parallel to said grooves, and wherein said resilient means is comprised of a resiliently mounted yoke inserted within said slot.

7. A rewinding device as set forth in claim 6 wherein the depth of said slot is sufficient to allow said resiliently mounted yoke to contact the walls of said shallower groove only.

8. A rewinding device as set forth in claim 7 wherein said resiliently mounted yoke is comprised of a rod disposed within said slot, and a coil spring surrounding said shaft and secured to the ends of said rod to resiliently urge said rod radially within said slot and against the side of said shaft.

References Cited in the file of this patent
UNITED STATES PATENTS

| | | |
|---|---|---|
| 396,070 | Burroughs | Jan. 15, 1889 |
| 707,317 | Gedge | Aug. 19, 1902 |
| 1,618,387 | Prindle | Feb. 22, 1927 |
| 2,481,665 | Henne | Sept. 13, 1949 |
| 2,509,791 | Swanson | May 30, 1950 |
| 2,674,931 | Mihalyi | Apr. 13, 1954 |